United States Patent [19]

Davidson et al.

[11] Patent Number: 5,057,332

[45] Date of Patent: * Oct. 15, 1991

[54] APPARATUS AND PROCESS FOR MARINATING FOODSTUFFS

[75] Inventors: Peter G. Davidson, Malibu; Robert H. Clark, III, Big Bear Lake, both of Calif.

[73] Assignee: Minute Marinator, Inc., Big Bear City, Calif.

[ * ] Notice: The portion of the term of this patent subsequent to Apr. 4, 2006 has been disclaimed.

[21] Appl. No.: 331,854

[22] Filed: Apr. 3, 1989

Related U.S. Application Data

[63] Continuation-in-part of Ser. No. 142,183, Jan. 11, 1988, Pat. No. 4,818,550.

[51] Int. Cl.$^5$ .......................... A22C 9/00; A23L 1/318
[52] U.S. Cl. ........................................ 426/281; 99/468; 99/472
[58] Field of Search .................. 99/472, 468; 426/281, 426/486

[56] References Cited

U.S. PATENT DOCUMENTS

| | | | |
|---|---|---|---|
| 657,207 | 9/1900 | Washburn | 99/451 |
| 2,157,624 | 5/1939 | Overmyer | 99/472 |
| 2,629,311 | 2/1953 | Graves | 99/472 |
| 3,315,590 | 4/1967 | Payne | 99/472 |
| 3,370,959 | 2/1968 | Moore et al. | 426/281 |
| 3,928,634 | 12/1975 | Gasbarro | 426/281 |
| 4,018,908 | 4/1977 | Gross | 426/281 |
| 4,321,862 | 3/1982 | Stevenson | 99/472 |
| 4,331,691 | 5/1982 | Poovaiah et al. | 99/472 |
| 4,498,378 | 2/1985 | Norrie et al. | 99/472 |
| 4,818,550 | 4/1989 | Davidson | 426/281 |

Primary Examiner—Wilbur Bascomb, Jr.
Attorney, Agent, or Firm—Lyon & Lyon

[57] ABSTRACT

An apparatus and process for marinating foodstuffs in a short period of time are disclosed. The apparatus includes a base assembly defining a support surface, a removable cover disposed over the support surface and defining therewith an air-tight vessel for holding the foodstuffs and the marinade, and a vacuum pump assembly for withdrawing air from the vessel through a vacuum port communicating therewith. Upon withdrawing the air from the vessel and reducing the pressure therein, the foodstuffs expand and air is drawn out of the foodstuffs, creating voids therein, and, upon opening a pressure relief valve and returning the pressure therein to atmospheric, the marinade is drawn into the voids in the foodstuffs, thereby tenderizing and imparting flavor to the foodstuffs.

18 Claims, 5 Drawing Sheets

APPARATUS AND PROCESS FOR MARINATING FOODSTUFFS

This is a continuation-in-part of Ser. No. 142,183, filed Jan. 11, 1988, now U.S. Pat. No. 4,818,550 and entitled Apparatus and Process for Marinating Foodstuffs.

BACKGROUND OF THE INVENTION

It is common practice to marinate less expensive cuts of meat prior to cooking, particularly when barbecuing, to tenderize and improve the flavor thereof. While marinating is generally successful in enhancing the flavor of the meat, its ability to tenderize is somewhat limited, and it is a very time consuming process. Allowing meat to rest in a marinade for as long as twenty-four hours prior to cooking is common. As time does not always permit such thorough marinating, the quality of the cooked steak is often less than what it would have been with proper preparation.

While marinating is generally not necessary with the higher quality and more expensive cuts of meat, lesser cuts, such as flank and should steaks, will generally suffer in quality if not thoroughly marinated prior to cooking. Accordingly, people will often refrain from purchasing the less expensive cuts of meat because they either do not have the time to marinate the meat properly, and/or because they feel such meat is not sufficiently tender. While marinating is a simple process, the time it takes is often a substantial problem.

It would therefore be highly desirable to provide a means for thoroughly marinating foodstuffs which greatly reduces the time required to achieve the desired result. The apparatus and process disclosed herein not only thoroughly marinates foodstuffs in a small fraction of the time heretofore required for the process, but tenderizes the food stuffs to a greater extent than conventional marinating. Such an apparatus and process is also described in copending application, Ser. No. 142,183, filed Jan. 11, 1983 now U.S. Pat. No. 4,818,550. While the process disclosed therein is basically the same as that disclosed here, the apparatus disclosed herein has been modified to facilitate manufacture while retaining all of the benefits of the new marinating process.

SUMMARY OF THE INVENTION

Briefly, the present invention is directed to an apparatus and process for rapidly marinating foodstuffs to enhance the flavor and tenderness thereof. The apparatus includes a pressure-tight vessel and a pump assembly for withdrawing air from the vessel and maintaining the interior of the vessel at a reduced pressure. The foodstuff to be marinated is placed in a marinade within the vessel. The pressure within the vessel is then reduced by withdrawing air from the vessel, causing the foodstuff to swell, while the air trapped within the food is drawn therefrom. The foodstuff is then allowed to remain in the marinade for a short period of time, whereupon the interior of the vessel is returned to atmospheric pressure. As the pressure rises within the vessel, the marinade passes into the foodstuffs, filling the voids created by the existing air, thereby rapidly tenderizing and imparting the flavor of the marinade to the foodstuffs.

It is the principal object of the present invention to provide a method and apparatus for thoroughly marinating foodstuffs in a short period of time.

It is another object of the present invention to provide a method and apparatus for rapidly imparting the flavor of a marinade to an inexpensive cut of meat, while concurrently tenderizing the meat.

It is yet another object of the present invention to provide apparatus for thoroughly marinating foodstuffs in a short period of time which is of simple construction and economical to manufacture.

These and other objects and advantages of the present invention will become apparent from the following detailed description taken in conjunction with the accompanying drawings.

DESCRIPTION OF THE PREFERRED EMBODIMENT

Referring now in detail to the drawings, the marinating device 10 of the present invention illustrated in FIGS. 1-7 and 10 comprises a pressure-tight vessel 12 defined by a base assembly 14 and a removable lid or cover 16, and a vacuum pump assembly 18 disposed within the base assembly for evacuating air from the vessel 12 to effect rapid marinating of the foodstuffs disposed therein in the manner to be described.

The base assembly 14 is of a circular configuration, preferably constructed of ABS plastic, and defines a bottom wall portion 20, a side wall portion 22, and an upper wall portion 24, with the vacuum pump assembly 18 being disposed interiorally thereof. The side wall portion 22 of the base assembly 14 extends upwardly from the bottom wall portion 20 and curves outwardly at 26 so as to abut and be joined with the correspondingly configured extended end 27 of the upper wall portion 24 to define a semi-circular annular carrying rib 28 extending about the perimeter of the base assembly 14 adjacent the upper end thereof. The upper wall portion 24 of the base assembly 14 defines a circular support surface 30 inwardly of carrying rib 28, an annular recess 32 between support surface 30 and carrying rib 28, and an annular vertical support rib 34 disposed below recess 32. A generally "U"-shaped annular sealing ring 36, preferable constructed of silicone rubber, is disposed within recess 32 for sealing engagement with the lower annular end portion 37 of cover 16. Cover 16, support surface 30 of base assembly 14 and sealing ring 36 thus define the air-tight vessel 12.

Figures 9, 10:
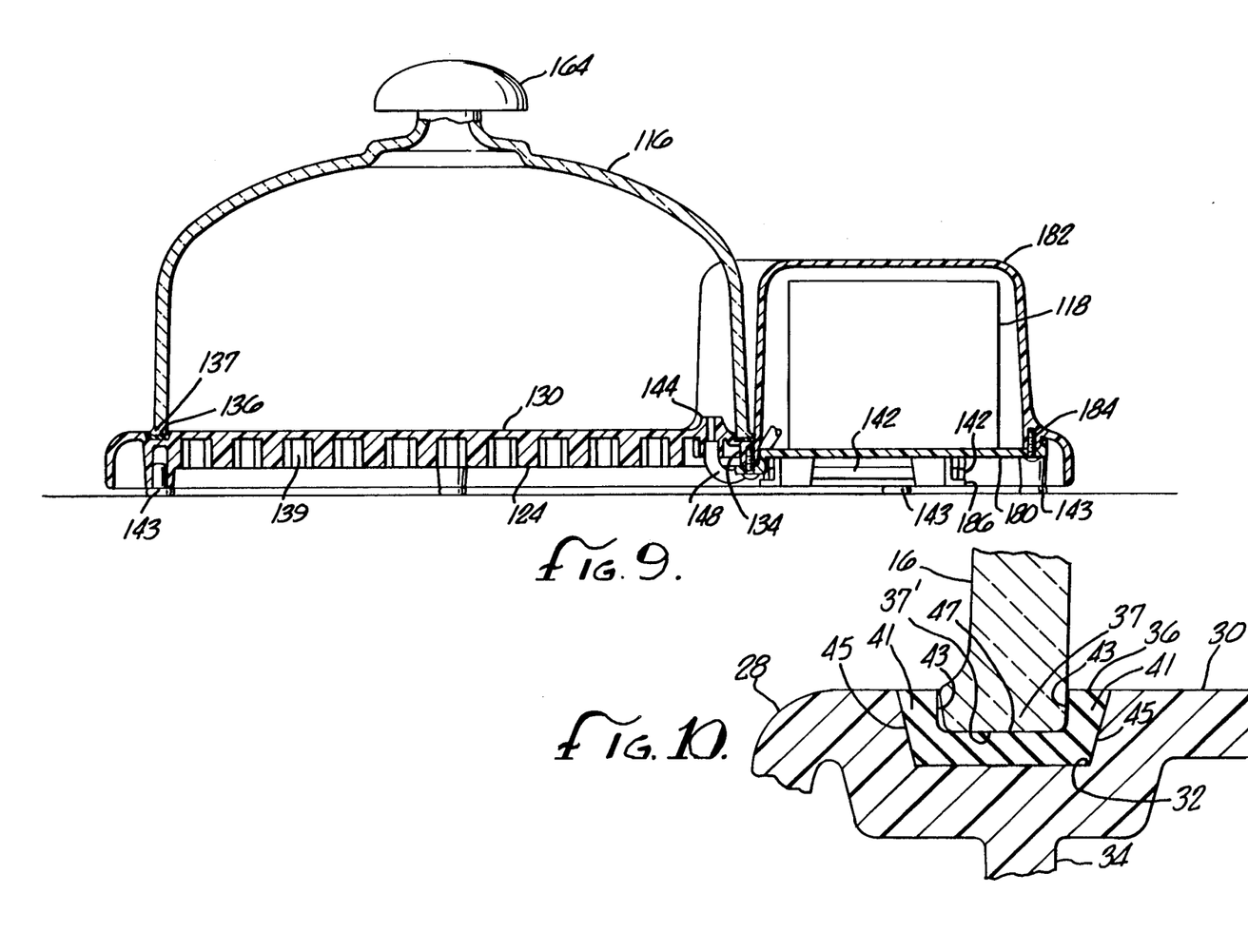
FIG. 9 is a sectional view taken along line 9—9 in FIG. 8.
FIG. 10 is an enlarged sectional view of the sealing ring and lower end portion of the cover of the present invention.

As seen in FIG. 10, sealing ring 36 is preferably configured such that the upstanding arm portions 41 thereof define vertical interior surfaces 43 adapted to sealably engaged the vertical side wall of the lower end portion 37 of cover 16, and the exterior surfaces 45 of arm portions 41 are slightly tapered to mate with the corresponding configured sides of recess 32. The flat spanning portion 47 of sealing ring 36 sealably engages the flat annular end surface 37' of cover 16. In the preferred configuration of cover 16, the annular end portion 37 is of an increased transverse dimension to effect better sealing contact between end surface 37' and sealing ring 36. The resultant configuration effects a secure air-tight seal between the cover 16 and base assembly 14 about support surface 30. Cover 16 is preferably dome-shaped and constructed of translucent polycarbonate, although the cover could be constructed of glass if desired.

Figure 3:
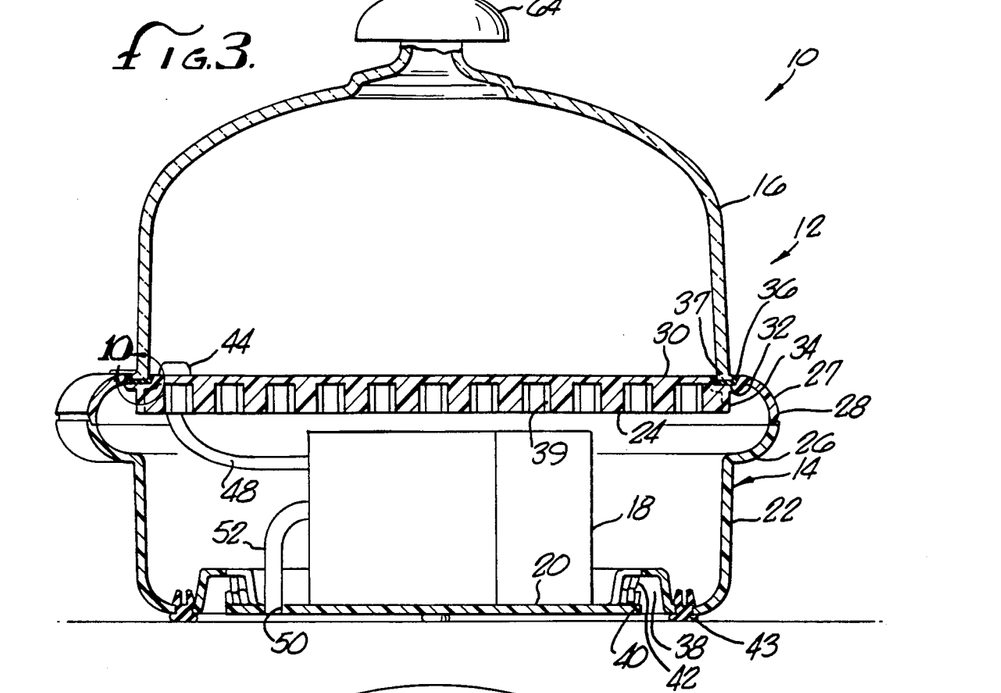
FIG. 3 is a sectional view taken along line 3—3 in FIG. 2.
Figure 4:
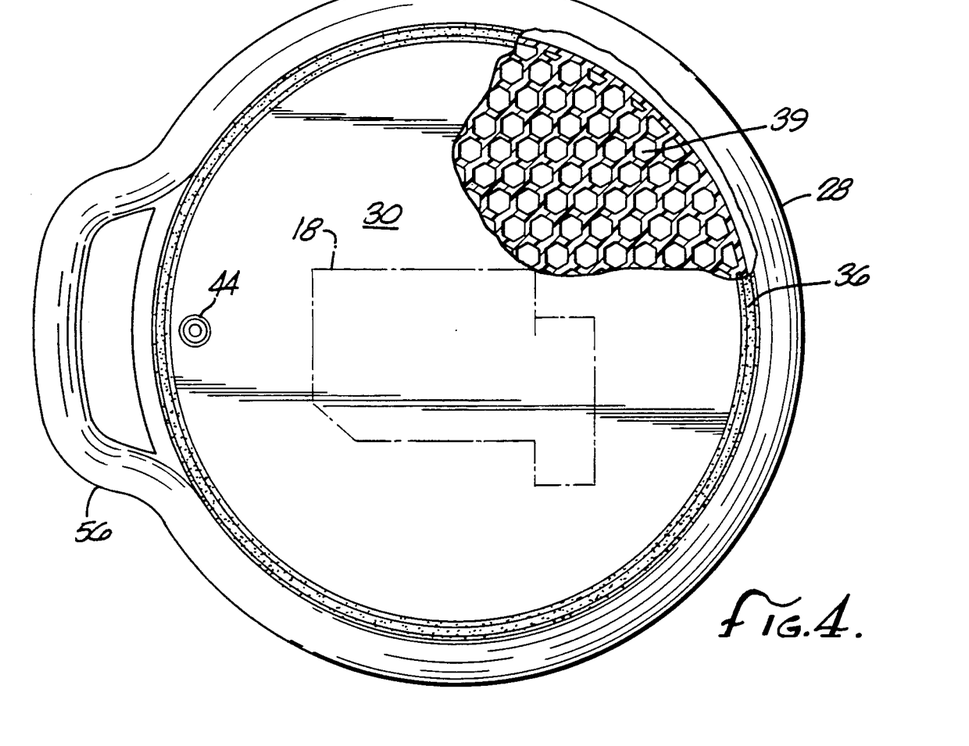
FIG. 4 is a sectional top view of the first embodiment of the present invention with a portion of the support surface broken away to illustrate the honeycomb structure of the underside of the upper wall portion of the base assembly.

To enable the upper wall portion 24 of the base assembly to withstand the stress created by evacuating the air from within cover 16 without the need for additional reinforcement, the underside thereof defines a honeycomb structure 39 interiorly adjacent the annular vertical support rib 34 as seen in FIGS. 3 and 4. The resultant structure minimizes the deflection of the upper wall portion 24 and of the support surface 30 into cover 16 upon the air therein being evacuated and minimizes any rotational deflection of the perimeter portion of the support surface 30 below the depending end portion 37 of cover 16 so as to increase the durability of the apparatus and continually maintain an air tight seal between the support cover 16 and the sealing ring 36.

Figures 5, 6:
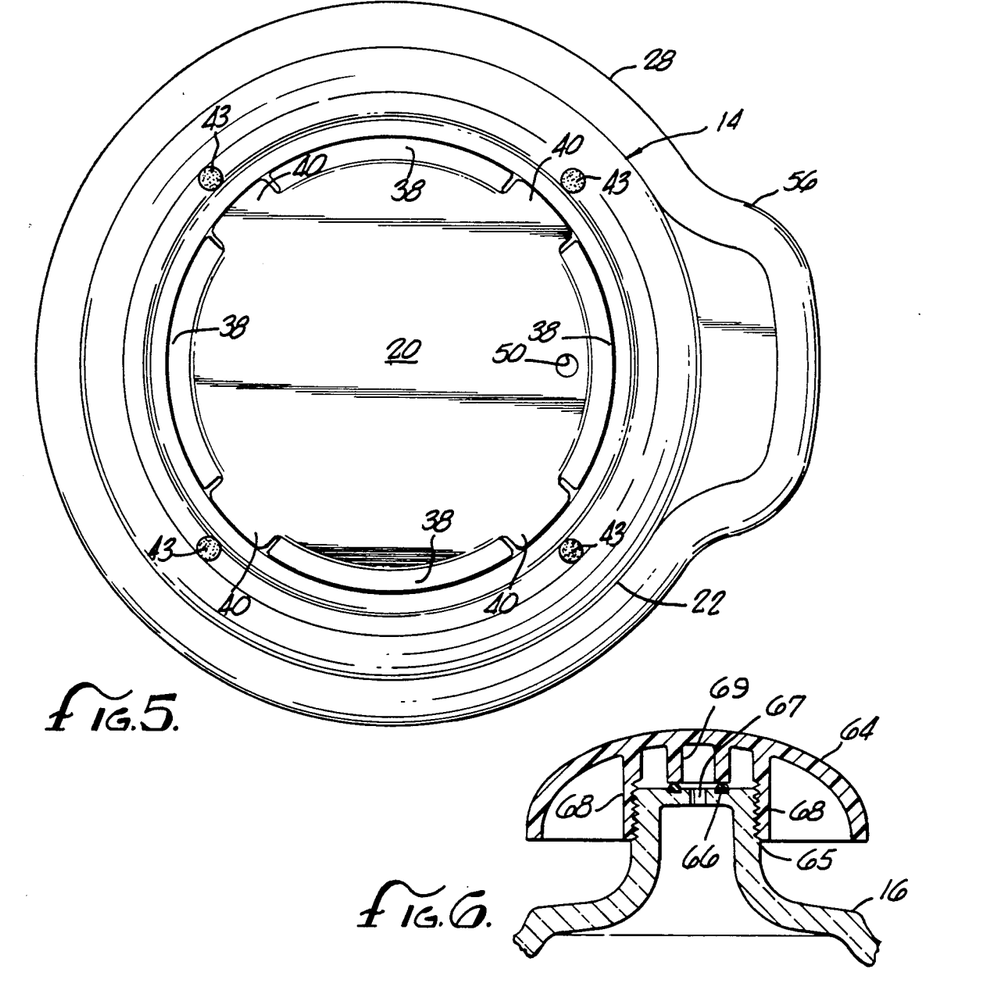
FIG. 5 is a bottom view of the first embodiment of the present invention.
FIG. 6 is an enlarged sectional view of a pressure relief valve in the handle of the cover of the present invention.

The bottom wall portion 20 of base assembly 14 preferably defines an annular recess 38 therein, partially enclosed by a radial flange 40 so that the electrical outlet cord 42 of the vacuum pump assembly 18 can be secured by flange 40 and disposed within the recess 38 for storage purposes. A plurality of rubber foot members 43 are also preferable mounted in the bottom wall 20 of the base assembly 14 to dampen any vibration during operation of the vacuum pump assembly 18.

The vacuum pump assembly 18 is preferably of a conventional configuration capable of drawing a vacuum within the range of 15-24 in. Hg to provide both an efficient and economical marinating device. It should be noted, however, that vacuum pump assemblies having a larger pumping capacity could also be employed, albeit at greater expense, so as to be capable of drawing a vacuum within cover 16 up to about 27 in. Hg. The vacuum pump assembly 18 is secured to the interior surface of the bottom wall portion 20 of base assembly 14 and communicates with the interior of vessel 12 by means of a vacuum inlet port 44 formed in the upper wall portion 24 of base assembly 14, preferably inwardly adjacent the perimeter thereof. A conventional conduit fitting 46 and an air conduit 48 which extends between inlet port 44 and the air inlet of pump assembly 18 are provided to communicate port 44 with the vacuum pump assembly 18. An exhaust port 50 is provided in bottom wall 20 of the base assembly which in turn communicates with the vacuum pump assembly 18 by means of conduit 52 for the evacuation of air from the vacuum pump assembly.

Figure 1:
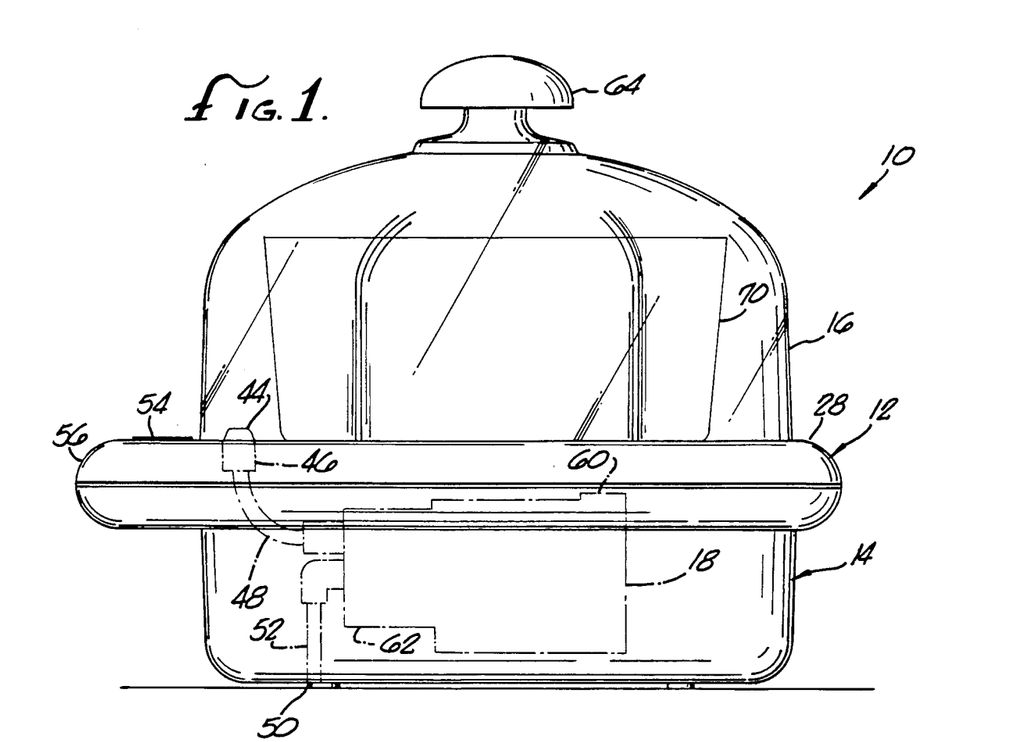
FIG. 1 is a side view of the first embodiment of the present invention.
Figure 2:
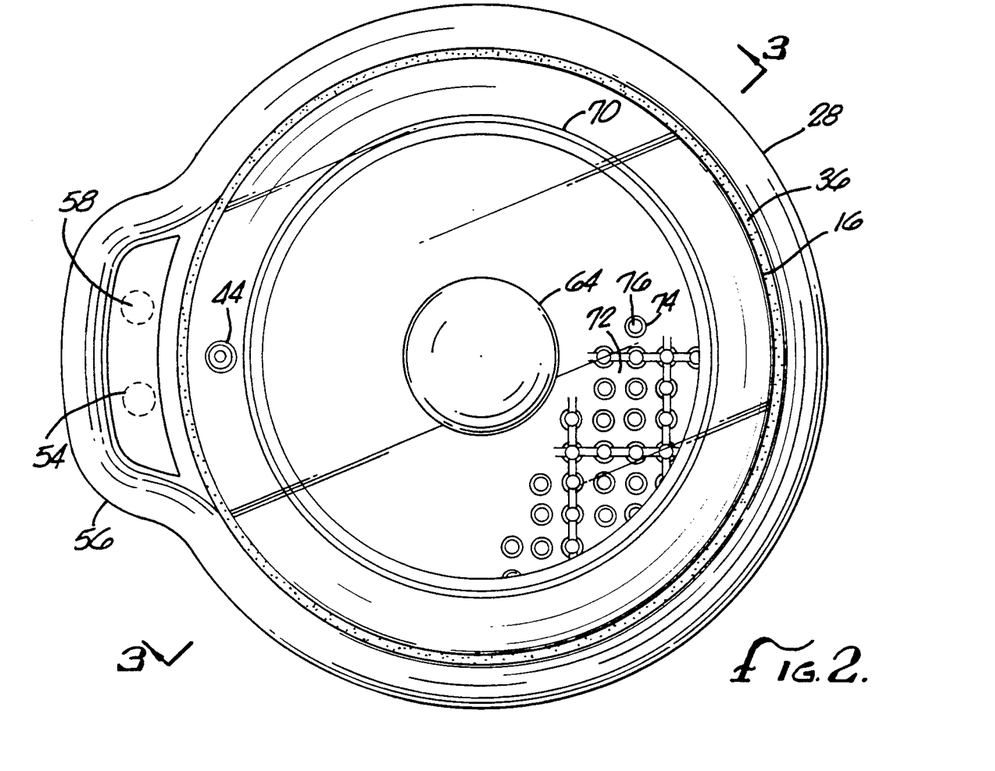
FIG. 2 is a top view of the first embodiment of the present invention illustrating a container therein for holding the foodstuffs to be marinated and the marinade and showing a portion of the interior bottom surface of the container.

An activating switch 54 is provided for vacuum pump assembly 18 and is preferable located on a radial extension 56 of the carrying rib 28 formed by the extended end portions of the side and upper wall portions 22 and 24 of the base assembly 14. An indicator light 58 can also be provided in extension 56 adjacent switch 54 for illumination when the valve pump assembly is activated. An automatic timer 60 is preferably provided with and operatively connected to the vacuum pump assembly 18 for automatically deactivating the pump assembly after about three to five minutes of operation. A pressure relief valve 62 is provided to release the vacuum within vessel 12 upon deactivation of the pump assembly. Without such a pressure relief valve, the cover 16 could not be removed from the base assembly 14 due to the reduced pressure therein.

A pressure relief valve 62 could be provided in the vacuum pump assembly 18 itself such that the pressure would be automatically released upon deactivation of the pump assembly, or, alternatively, a manually activated pressure relief valve could be provided, as for example, in an upper handle 64 secured to cover 16 to relieve the reduced pressure within cover 16. An example of such a valve mechanism is illustrated in FIG. 6. As seen therein, the upper end of cover 16 defines an upstanding neck portion 65 having an "O"-ring 66 mounted in the upper end thereof about an air inlet aperture 67. Handle 64 defines a first depending cylindrical extension 68 which is in threaded engagement with neck portion 65 and a second inwardly spaced cylindrical extension 69 adapted to abut "O"-ring 66 and thereby seal inlet aperture 67 upon the handle 64 being tightened down about the neck portion 65 of cover 16. Upon rotating handle 64 so as to move the handle upwardly on neck portion 65, extension 69 moves away from "O"-ring 66, breaking the air-tight seal therebetween and allowing air to pass between the engaged threads on the neck portion 65 of cover 16 and extension 68 of handle 64 and into the interior of cover 16 through aperture 67. A stop (not shown) can be provided, if desired, in the path of the mating threads to limit counter-clockwise rotation of the handle 64 on the cover 16 and thereby prevent removal of the handle from the cover.

Figure 7:
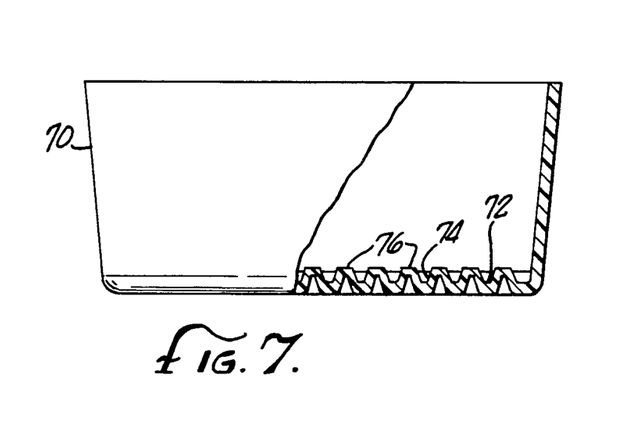
FIG. 7 is a partial sectional view of an open container for holding the foodstuffs and the marinade in the apparatus of the present invention.

To prevent the marinade from passing into the vacuum inlet port 44 of the base assembly, the foodstuffs to be marinated and the marinade are placed within a separate open container 70 which rests on the support surface 30 of the base assembly 14 under cover 16. In the preferred construction of container 70, the bottom interior surface 72 thereof is provided with a plurality of frustoconical projections 74, with each projection terminating at its upper end in a support surface 76 as seen in FIG. 7. The plurality of individual support surfaces 76 are co-planar so as to define a support surface for the foodstuffs to be marinated which is elevated above the bottom interior surface 72 of container 70 to provide continual access of the marinade to the underside of the foodstuffs therein. Other configurations of the interior bottom surface of container 70, such as elevated ribs, could also be employed for this purpose.

In use, the foodstuffs to be marinated are placed within the open container 70, marinade is then poured into the container 70 to a desired depth, the container is then placed on the support surface 30 of base assembly 14 and the cover 16 is disposed atop the base assembly such that the annular end portion 37 thereof is disposed within the sealing ring 36. The vacuum pump assembly 18 is then activated by switch 54, drawing air out of the chamber defined by the cover 16 and support surface 30 to create a pressure differential within the range of 15–27 in. Hg. As the pressure within the vessel drops, the air within the meat or other foodstuffs is drawn out of the foodstuffs and bubbles to the surface of the marinade. As the vacuum increases, more air evacuates the foodstuffs. After about four to five minutes, the marinating process is complete. The vacuum pump assembly 18 is deactivated and the vacuum within the vessel is released by the pressure relief valve 64. As the air pressure rapidly increases within the vessel 12, the marinade invades the foodstuffs, flowing into the voids therein created by the exiting air.

In a test utilizing the aforesaid process with a boneless beef chunk shoulder steak, it was found that a vacuum of about 24 in. Hg was obtained after about one minute of activation of the vacuum pump. This vacuum was maintained for four minutes whereupon the pump was deactivated and the chamber about the foodstuffs was returned to atmospheric pressure. The steak was then reweighed. The result was a weight increase of the meat of about 2.3 percent which represented a more thorough marinating of the meat in five minutes than was obtained in twenty-four hours of marinating by the conventional process.

Figure 8:
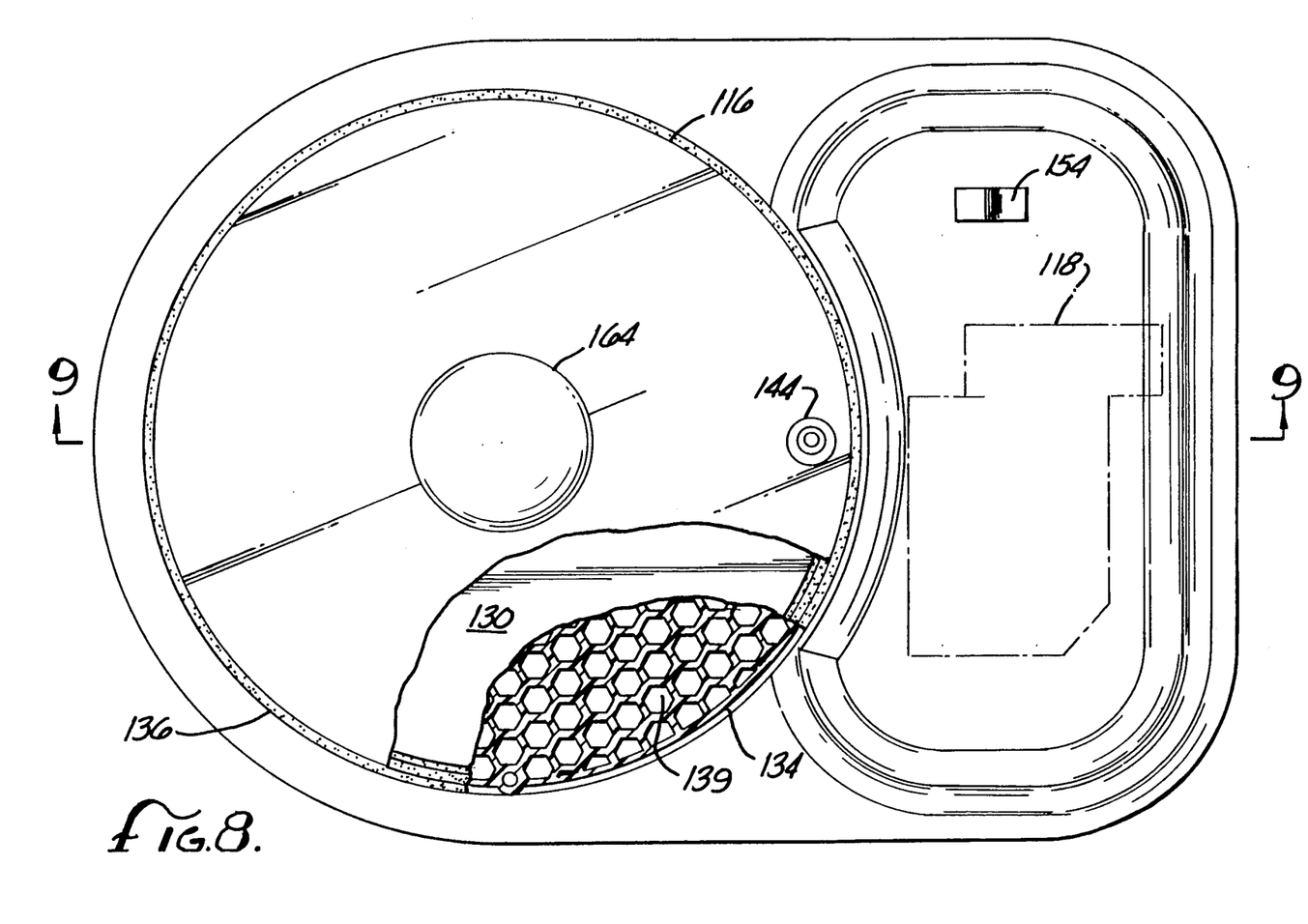
FIG. 8 is a top view of a second embodiment of the present invention with a portion of the support surface broken away to illustrate the honeycomb structure of the underside of the horizontal wall portion of the base assembly.

A second embodiment of the present invention is illustrated in FIGS. 8 and 9. This embodiment differs from the prior embodiment in the configuration of the base assembly and the relative positioning of the vacuum pump assembly with respect to the cover and support surface. In the second embodiment, the vacuum pump assembly 118 is disposed on the base assembly 114 adjacent the cover 116 as opposed to being disposed below the cover as in the prior embodiment. The operation and functioning of the two embodiments is the same.

As in the first embodiment of the marinating device, the second embodiment employees a dome-shaped cover 116 and a base assembly 114, with the base assembly defining a horizontal wall portion 124 which in turn defines an upper circular flat support surface 130 disposed above a honeycomb support structure 139. An annular sealing ring 136 of the same configuration as sealing ring 36 is provided in a recess disposed about support surface 130 for sealing engagement with the lower annular end portion 137 of the cover 116. The vacuum pump assembly 118 is mounted on a portion 180 of the base assembly 114 adjacent sealing surface 130 and a vacuum pump assembly cover 182 is provided about the vacuum pump assembly 118 and secured thereto by suitable fastening means 184. A plurality of "L"-shaped flanges 186 are provided on the underside of surface 180 below the vacuum pump assembly 118 for storage of the electrical outlet cord 142 of the vacuum pump assembly. The vacuum pump assembly communicates with the interior of cover 116 by means of a port 144 preferably formed in the perimeter portion of support surface 130 and an air conduit 148 extending between port 144 and the vacuum pump assembly. An exhaust port (not shown) is also provided in base assembly below the vacuum pump assembly for the evacuation of the air from the interior of cover 116, and, as with the prior embodiment, a plurality of foot members 143 are provided in the underside of the base assembly 114 to dampen vibration. A pressure relief valve is also provided either in the vacuum pump assembly 118 or in the handle 164 of the cover 116. It is to be understood, however, that in either of the embodiments of the invention, the pressure relief valve could be disposed at other locations communicating with the interior of the marinating device cover to effect the passage of air into the interior thereof to return the pressure therein to atmospheric.

Various other changes and modifications may be made in carrying out the present invention without departing from the spirit and scope thereof. Insofar as these changes and modifications are within the purview of the appended claims, they are to be considered as part of the present invention.

We claim:

1. An apparatus for marinating foodstuffs in a marinade comprising: a base assembly; a generally planar and rigid fluid impermeable support surface defined by said base assembly; an annular sealing member disposed about the perimeter of said support surface; a removable cover adapted to be disposed over and about said support surface and abut said annular sealing member for forming an air-tight seal therebetween and defining an air-tight chamber within said cover; a vacuum port disposed in said support surface; a vacuum pump assembly carried by said base assembly in fluid communication with said port for withdrawing air from said chamber through said port to reduce the pressure within said chamber to about 15–27 in. Hg. below atmospheric pressure; and means for activating and deactivating said pump assembly.

2. An apparatus for marinating foodstuffs in a marinade comprising: a base assembly; a support surface defined by said base assembly; a removable cover disposed over said support surface; sealing means disposed about said support surface and adapted to abut said cover for forming an air-tight seal therebetween; a vacuum port disposed in said support surface; a vacuum pump assembly carried by said base assembly in fluid communication with said port for withdrawing air from the interior of said cover through said port to reduce the pressure within said cover to about 15–27 in. Hg. below atmospheric pressure; and means for activating and deactivating said pump assembly, said support surface defining a honeycomb structure on the underside thereof to prevent said surface from being deformed and drawn partially into said cover upon the pressure within said cover being reduced by said vacuum pump assembly.

3. The apparatus of claim 2 including an annular upstanding supporting rib member defined by said base assembly and extending about said support surface and below said sealing means.

4. The apparatus as in claims 1, 2 or 3 wherein said base assembly defines an annular recess therein disposed about said support surface and wherein said sealing means comprises an annular sealing ring generally "U"-shaped in cross section and is disposed in said recess.

5. The apparatus of claim 4 wherein said sealing ring defines upstanding arm portions, said arm portions defining substantially vertical interior surfaces adapted to abut in sealing engagement with portions of said cover and defining tapered exterior surfaces adapted to abut portions of said base assembly about said annular recess therein.

6. An apparatus for marinating foodstuffs in a marinade comprising: a base assembly including a bottom wall portion, a side wall portion, and an upper wall portion; a support surface defined by said upper wall portion; an annular sealing member disposed in said upper wall portion and extending about said support surface; a removable cover adapted to be disposed over said support surface and in sealing engagement with said annular sealing member; a vacuum port disposed in said upper wall portion of said base assembly; a vacuum pump assembly disposed within said base assembly and carried by said bottom wall portion thereof, said vacuum pump assembly being in fluid communication with said port for withdrawing air from the interior of said cover through said port to reduce the pressure within said cover to about 15–27 in. Hg. below atmospheric pressure; means for activating said pump assembly; means for deactivating said pump assembly upon the passage of a predetermined amount of time; and means for returning the pressure within said cover to atmospheric upon deactivation of said pump assembly.

7. The assembly of claim 6 wherein said upper wall portion defines a honeycomb support structure below said support surface and a vertical rib below said sealing means.

8. The assembly as in claims 6 or 7 including an annular recess disposed in said upper wall portion of said base assembly, said sealing member being disposed in said recess, being substantially "U"-shaped in cross section, and defining a pair of upstanding arm portions and a spaning portion, said arm portions defining substantially vertical interior contact surfaces and inclined exterior surfaces, said spaning portion being adapted to abut a first portion of said cover, said interior contact surfaces being adapted to abut a second portion of said cover adjacent said first portion, and said external contact surfaces abutting portions of said upper wall portion of said base assembly about said recess therein.

9. The apparatus as in claims 6 or 7 wherein the pressure returning means comprises a handle threadaby engaging said cover, an air inlet aperture disposed in said cover below said handle, an annular sealing member carried by said cover about said aperture and a cylindrical contact member depending from said handle and adapted to either bear against said annular sealing member on said cover or be spaced therefrom depending on the rotational direction of said handle with respect to said cover to effect opening and closing of said air inlet aperture in said cover.

10. An apparatus for marinating foodstuffs in a marinade comprising: a base assembly including a first generally planar and rigid fluid impermeable support surface and a second support surface, said second surface being disposed laterally adjacent said first surface; an annular sealing member disposed about the perimeter of said first support surface; a removable cover adapted to be disposed over said first support surface and abut said annular sealing member forming an air-tight seal therebetween and defining an air-tight chamber within said cover; a vacuum port disposed in said first support surface; a vacuum pump assembly disposed on said second support surface, said vacuum pump assembly being in fluid communication with said port for withdrawing air from said chamber through said port to reduce the pressure within said chamber to about 15–27 in. Hg. below atmospheric pressure; and means for activating and deactivating said pump assembly.

11. An apparatus for marinating foodstuffs in a marinade comprising: a base assembly including a first support surface and a second support surface, said second surface being disposed adjacent said first surface; an annular sealing member disposed about said first support surface; a removable cover adapted to be disposed over said first support surface and in sealing engagement with said annular sealing member; a vacuum port disposed in said first support surface; a vacuum pump assembly disposed on said second support surface, said vacuum pump assembly being in fluid communication with said port for withdrawing air from the interior of said cover through said port to reduce the pressure within said cover to about 15–27 in. Hg. below atmospheric pressure; and means for activating and deactivating said pump assembly, said support surface defining a honeycomb structure on the underside thereof to prevent said surface from being deformed and drawn partially into said cover upon the pressure within said cover being reduced by said vacuum pump assembly.

12. A process for marinating foodstuffs in a short period of time consisting only of the steps of: placing the foodstuffs in a marinade in an air-tight vessel; reducing the pressure within the vessel to a level of about 15–27 in. Hg. below atmospheric pressure; allowing the foodstuffs to remain at rest in the marinade for about 3–5 minutes; introducing air into the vessel to raise the pressure therein to atmospheric; and removing the foodstuffs from the marinade.

13. An apparatus for marinating foodstuffs in a marinade comprising: a base assembly; a support surface defined by said base assembly; an annular recess in said base assembly disposed about said support surface; a removable cover disposed over said support surface; an annular sealing ring generally "U"-shaped in cross section disposed in said recess, extending about said support surface and adapted to abut said cover for forming an air-tight sealed therebetween; a vacuum port disposed in said support surface; a vacuum pump assembly carried by said base assembly in fluid communication with said port for withdrawing air from the interior of said cover through said port to reduce the pressure within said cover to about 15–27 in. Hg. below atmospheric pressure; and means for activating and deactivating said pump assembly.

14. The apparatus as in claims 10 or 11 wherein said base assembly defines an annular recess therein disposed about said support surface and wherein said sealing means comprises an annular sealing ring generally "U"-shaped in cross section and is disposed in said recess.

15. An apparatus for marinating foodstuffs in a marinade comprising: a base assembly including a first generally planar and rigid fluid impermeable support surface, an annular recess disposed about said first support surface and a second support surface, said second surface being disposed adjacent a portion of said recess; an annular sealing member disposed in said recess and extending about said first support surface; a removable cover adapted to be disposed over and about said first support surface and abut said annular sealing member for forming an air-tight seal therebetween and defining an air-tight chamber within said cover; a vacuum port disposed in said first support surface; a vacuum pump assembly disposed on said second support surface, said vacuum pump assembly being in fluid communication with said port for withdrawing air from said chamber through said port to reduce the pressure within said chamber to about 15–27 in. Hg. below atmospheric pressure; and means for activating and deactivating said pump assembly.

16. The apparatus as in claims 10, 11, 13 or 15 including a handle threadably mounted on said cover and valve means operatively associated with said handle for returning the pressure within said chamber to atmospheric upon deactivation of said pump assembly and rotation of said handle with respect to said cover.

17. An apparatus for marinating foodstuffs in a marinade comprising: a base assembly defining a rigid fluid impermeable support surface and a first interior chamber disposed below said support surface: an annular sealing member disposed about the perimeter of said support surface; a removable cover adapted to be disposed over and about said support surface and abut said annular sealing member for forming an air-tight seal therebetween and defining an air-tight chamber within said cover; a vacuum port disposed in said support surface communicating with said air-tight chamber; a vacuum pump assembly disposed in said first interior chamber and in fluid communication with said port for withdrawing air from said chamber through said port to reduce the pressure within said air-tight chamber to about 15-27 in. Hg. below atmospheric pressure; and means for activating and deactivating said pump assembly.

18. An apparatus for marinating foodstuffs in a marinade comprising: a base assembly including a first rigid fluid impermeable support surface and a second support surface disposed laterally adjacent said first surface; an annular sealing member extending between said first and second support surfaces and disposed about the perimeter of said first support surface; a removable cover adapted to be disposed over said first support surface and abut said annular sealing member forming an air-tight seal therebetween and defining an air-tight chamber within said cover; a vacuum port disposed in said first support surface; a vacuum pump assembly disposed on said second support surface, said vacuum pump assembly being in fluid communication with said port for withdrawing air from said chamber through said port to reduce the pressure within said air-tight chamber to about 15-27 in. Hg. below atmospheric pressure; and means for activating and deactivating said pump assembly.

* * * * *